United States Patent
Bauchspies (10) Patent No.: US 9,940,502 B2
(45) Date of Patent: Apr. 10, 2018

(54) PRE-MATCH PREDICTION FOR PATTERN TESTING

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 182 days.

(21) Appl. No.: 14/689,821

(22) Filed: Apr. 17, 2015

(65) Prior Publication Data

US 2016/0253546 A1 Sep. 1, 2016

Related U.S. Application Data

(60) Provisional application No. 62/126,140, filed on Feb. 27, 2015.

(51) Int. Cl.
*G06K 9/00* (2006.01)
*G06K 9/68* (2006.01)

(52) U.S. Cl.
CPC ......... *G06K 9/00087* (2013.01); *G06K 9/001* (2013.01); *G06K 9/0008* (2013.01); *G06K 9/00067* (2013.01); *G06K 9/685* (2013.01)

(58) Field of Classification Search
CPC .......... G06K 9/00087; G06K 9/00067; G06K 9/685; G06K 9/001; G06K 9/0008
See application file for complete search history.

(56) References Cited

U.S. PATENT DOCUMENTS

| | | | |
|---|---|---|---|
| 4,573,201 A | 2/1986 | Hashiyama et al. | |
| 5,799,098 A | 8/1998 | Ort et al. | |
| 5,828,773 A | 10/1998 | Setlak et al. | |
| 5,845,005 A | 12/1998 | Setlak et al. | |
| 5,852,670 A | 12/1998 | Setlak et al. | |
| 5,909,501 A | 6/1999 | Thebaud | |
| 5,926,555 A | 7/1999 | Ort et al. | |
| 5,937,082 A * | 8/1999 | Funada .............. | G06K 9/00067 382/125 |

(Continued)

FOREIGN PATENT DOCUMENTS

| | | |
|---|---|---|
| EP | 1183638 A1 | 3/2002 |
| JP | 2007018168 A | 1/2007 |

(Continued)

OTHER PUBLICATIONS

Xuying Zhao et al: "A Novel Two Stage Cascading Algorithm for Fingerprint Recognition", Proceedings of the 2ND International Symposium on Computer, Communication, Control and Automation, Dec. 1, 2013 (Dec. 1, 2013), XP044276297, Paris, France DOI: 10.2991/3ca-13.2013.76)-ISBN 978-1-62993-977-3.

(Continued)

*Primary Examiner* — Samir Ahmed (74) *Attorney, Agent, or Firm* — Patent Law Offices of Michael E. Woods; Michael E. Woods (57) ABSTRACT

A system and method for improving speed of automated pattern testing for any particular hardware configuration. A pattern testing includes a matching process and a pre-match process that establishes features of interest used in the match process. The pre-match process is used to predict a likelihood of a passed match (or a failed match) and alters the subsequent match process in response to the prediction.

20 Claims, 4 Drawing Sheets

(56) References Cited

U.S. PATENT DOCUMENTS

| | | | |
|---|---|---|---|
| 6,041,133 A * | 3/2000 | Califano | G06K 9/00067 |
| | | | 382/124 |
| 6,118,891 A * | 9/2000 | Funada | G06K 9/00067 |
| | | | 382/125 |
| 6,233,348 B1 * | 5/2001 | Fujii | G06K 9/00067 |
| | | | 382/125 |
| 6,241,288 B1 | 6/2001 | Bergenek et al. | |
| 6,285,789 B1 | 9/2001 | Kim | |
| 6,546,122 B1 | 4/2003 | Russo | |
| 6,795,569 B1 | 9/2004 | Setlak | |
| 6,836,554 B1 | 12/2004 | Bolle et al. | |
| 6,895,104 B2 | 5/2005 | Wendt et al. | |
| 7,027,626 B2 * | 4/2006 | Funada | G06K 9/00067 |
| | | | 340/5.83 |
| 7,142,699 B2 | 11/2006 | Reisman et al. | |
| 7,203,347 B2 | 4/2007 | Hamid | |
| 7,236,617 B1 | 6/2007 | Yau et al. | |
| 7,330,571 B2 | 2/2008 | Svensson et al. | |
| 7,330,572 B2 | 2/2008 | Uchida | |
| 7,512,256 B1 | 3/2009 | Bauchspies | |
| 7,539,331 B2 | 5/2009 | Wendt et al. | |
| 7,574,022 B2 | 8/2009 | Russo | |
| 7,599,529 B2 | 10/2009 | Fujii | |
| 7,599,530 B2 | 10/2009 | Boshra | |
| 7,616,787 B2 | 11/2009 | Boshra | |
| 7,634,117 B2 | 12/2009 | Cho | |
| 7,643,660 B1 | 1/2010 | Bauchspies | |
| 7,787,667 B2 | 8/2010 | Boshra | |
| 7,912,256 B2 | 3/2011 | Russo | |
| 7,970,186 B2 | 6/2011 | Bauchspies | |
| 8,055,027 B2 | 11/2011 | Nikiforov | |
| 8,295,561 B2 | 10/2012 | Kwan | |
| 8,514,131 B2 * | 8/2013 | Jovicic | G01S 5/0236 |
| | | | 342/451 |
| 8,638,939 B1 | 1/2014 | Casey et al. | |
| 8,638,994 B2 | 1/2014 | Kraemer et al. | |
| 8,782,775 B2 | 7/2014 | Fadell et al. | |
| 8,908,934 B2 | 12/2014 | Saito | |
| 9,092,652 B2 | 7/2015 | Marciniak et al. | |
| 9,202,099 B2 | 12/2015 | Han et al. | |
| 2007/0263912 A1 | 11/2007 | Biarnes et al. | |
| 2008/0013803 A1 * | 1/2008 | Lo | G06K 9/00067 |
| | | | 382/124 |
| 2009/0083847 A1 | 3/2009 | Fadell et al. | |
| 2014/0003681 A1 | 1/2014 | Wright et al. | |
| 2014/0056493 A1 | 2/2014 | Gozzini | |
| 2015/0135108 A1 | 5/2015 | Pope et al. | |
| 2015/0286855 A1 | 10/2015 | Neskovic et al. | |
| 2015/0294131 A1 | 10/2015 | Neskovic et al. | |
| 2016/0253543 A1 | 9/2016 | Bauchspies | |
| 2016/0253546 A1 | 9/2016 | Bauchspies | |

FOREIGN PATENT DOCUMENTS

| | | |
|---|---|---|
| WO | 02096181 A2 | 12/2002 |
| WO | 2016135696 A1 | 9/2016 |
| WO | 2016135704 A1 | 9/2016 |

OTHER PUBLICATIONS

Cui J et al: "Improving Iris Recognition Accuracy Via Cascaded Classifiers", IEEE Transactions on Systems, Man, and Cybernetics: Part C: Applications and Reviews, IEEE Service Center, Piscataway, NJ, US, vol. 35, No. 3, Aug. 1, 2005 (Aug. 1, 2005), pp. 435-441, XP011136735, ISSN: 1094-6977, DOI:10.1109/TSMCC.2005.848169.

International Search Report for International application No. PCT/IB2016/051081 dated Aug. 12, 2016.

Written Opinon of the International Searcahing Authority for International application No. PCT/IB2016/051081.

International Search Report for International application No. PCT/IB2016/051090 transmitted Aug. 15, 2016.

Written Opinion of the International Searching Authority for PCT/IB2016/051090 transmitted Aug. 15, 2016.

Wang et al: "Fingerprint matching using OrientationCodes and Polylines", Pattern Recognition, Elsevier, GB, vol. 40, No. 11, Jul. 16, 2007 (Jul. 16, 2007), pp. 3164-3177, XP022155471, ISSN: 0031-3203, DOI: 10.1016/J. PATCOG.2007.02.020.

Arica N. et al: "BAS: a perceptual shape descriptor based on the beam angle statistics", Pattern Recognition Letters, Elsevier, Amsterdam, NL, vol. 24, No. 9-10, Jun. 1, 2003 (Jun. 1, 2003), pp. 1637-1649, XP004410701, ISSN: 0167-8655, DOI: 10.1016/S0167-8655(03)00002-3.

Michael Donoser et al: "Efficient Partial Shape Matching of Outer Contours", Sep. 23, 2009 (Sep. 23, 2009), Lecture Notes in Computer Science, Springer, DE, p. 281-292, XP019141346, ISBN: 978-3-642-12306-1.

Peng Li et al: "A Novel Fingerprint Matching Algorithm Using Ridge Curvature Feature", Jun. 2, 2009 (Jun. 2, 2009), Advances In Biometrics, Springer Berlin Heidelberg, Berlin, Heidelberg, pp. 607-616, XP019117974, ISBN: 978-3-642-01792-6.

Xuyi Ng Zhao et al: "A Novel Two stage Cascading Algorithm for Fingerprint Recognition", Proceedings Of The 2nd International Symposium on Computer, Communication, Control and Automation, Dec. 1, 2013 (Dec. 1, 2013), XP055276297, Paris, France DOI: 10.2991/3ca-13.2013.76 ISBN: 978-1-62993-977-3.

Koichi Ito, et al., "A Fingerprint Matching Algorithm Using Phase-Only Correlation", IEICE Trans. Fundamentals, vol. E87-A, No. 3, Mar. 2004.

Koichi Ito, et al., "A Fingerprint Recognition Algorithm Combining Phase-Based Image Matching and Feature-Based Matching" D. Zhang and A.K. Jain (Eds.) ICB 2005, LNCS 3832, pp. 316-325, 2005 (C) Springer-Verlag Berlin, Heidelberg 2005.

Koichi Ito, et al., "A Fingerprint Recognition Algorithm Using Phase-Based Image Matching for Low-Quality Fingerprints" 0-7803-9134-9/05/$20.00 (C) 2005 IEEE.

Sandhya Tarar et al., "Fingerpring Mosaicking Algorithm to Improve the Performance of Fingerprint Matching System" Computer Science and Information Technology 2(3): 142-151, 2014.

Anil Jain et al., "Fingerprint Mosaicking" Proceedings of IEEE International Conference on Acoustics, Speech, and Signal Processing (ICASSP), Orlando, Florida, May 13-17, 2002.

Arun Ross et al., "Image Versus Feature Mosaicing: A Case Study in Fingerprints" Proc. of SPIE conference on Biometric Technology for Human Identification III, (Orlando, USA), pp. 620208-1-620208-12, Apr. 2006.

Y.S. Moon et al., "Template Synthesis and Image Mosaicking for Fingerprint Registration: An Experimental Study" 0-7803-8484-9/04/$20.00 (C) 2004 IEEE.

* cited by examiner

PRE-MATCH PREDICTION FOR PATTERN TESTING

CROSS REFERENCE TO RELATED APPLICATIONS

This application claims benefit of U.S. Provisional Application No. 62/126,140 filed 27 Feb. 2015, the contents of which are hereby expressly incorporated by reference there to it is entirety for all purposes.

FIELD OF THE INVENTION

The present invention relates generally to automatic machine-implemented pattern testing, and more specifically, but not exclusively, to systems, methods, and computer program products for automated pre-match predictions of pattern matching, such as, for example, fingerprint verification or other biometric pattern testing.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Fingerprint verification includes a two-phase, or two-stage, evaluation. A sample image is acquired and relevant elements of that sample image are located. Then the relevant elements are used in a more rigorous match process to establish, within a predetermined level of accuracy, how likely it is that the sample image matches a reference image.

Adoption of patterning devices, for example, fingerprint sensors, in consumer systems is influenced by user costs. The costs are not just the retail price of the consumer system with a fingerprint sensor, but also performance in terms of speed, accuracy, and convenience of the features implemented by the fingerprint sensor. The performance is influenced by costs and features of processors and hardware associated with the fingerprint sensor. There is a natural tension in terms of cost versus performance in that lower cost systems may offer decreased speed and accuracy trade-offs.

What is needed is a system and method for improving speed of automated pattern testing for any particular hardware configuration.

BRIEF SUMMARY OF THE INVENTION

Disclosed is a system and method for improving speed of automated pattern testing for any particular hardware configuration. The following summary of the invention is provided to facilitate an understanding of some of the technical features related to automated pattern testing, and is not intended to be a full description of the present invention. A full appreciation of the various aspects of the invention can be gained by taking the entire specification, claims, drawings, and abstract as a whole. The present invention is applicable to other pattern testing systems and methods in addition to fingerprint sensors and match verification methods.

Some pattern testing processes include two phases—a match phase in which a machine implements a testing process wherein features of interest in an electronic representation of a sample pattern are evaluated to determine whether the sample pattern "matches" some reference, within a desired level of confidence. Before the evaluation can start, the machine establishes a particular set of features of interest in the sample pattern for processing in the subsequent phase. In the context of a fingerprint or other biometric pattern (e.g., retinal blood vessel pattern), the matching may be done to verify that a source of the sample pattern may be confidently established to be the source of a registered pattern within a trusted reference database.

These phases may be discrete and independent, operated in serial fashion with the pre-match phase completing before the matching phase begins. Other implementations may have all or portion of the pre-match phase conducted in parallel to the matching phase.

There are many different types of patterns that may be tested in this way. The disclosed embodiments highlight biometric patterns used for a matching test between two electronic representations of biometric patterns: a sample pattern and a reference pattern. The type of pattern is important insofar as it helps to establish the important features of interest. Features of interest are pattern structures that can reliably, within the context of the application, produce a match at the desired level of confidence. For example, for some applications, features of interest may include minutia (e.g., finger print ridge endpoints, branches, and other singularities). In other applications, features of interest may include curve segment conformity and in-group relative positioning. Other patterns or electronic representations of such patterns may suggest other appropriate features of interest.

Conventionally, it would be the case that these phases operated largely independent of each other once a set of features of interest were established for a particular sample pattern. That is, no matter the quality of the minutia that had been established, the match phase processed the minutia against a predetermined threshold value.

In contrast, embodiments of the present invention may dynamically set a threshold for use in the match phase based upon what happens during the pre-match phase. That is, in some cases the features of interest may be determined in such a way that the pre-match phase will predict that the match phase evaluating those features of interest will conclude that there is a match and in other cases it may predict that the match phase will conclude that there is no match.

Based upon several factors during the pre-match processing, the pre-match phase may predict a match. In such a case, some embodiments of the present invention may predict a match with enough confidence that the match phase may be used as a "sanity" check to determine whether the predicted match is a rational or reasonable conclusion. While a normal match phase may be employed, alternatively and preferably some aspect of the match phase may be made less rigorous or less onerous. This may be done by lowering a threshold required to pass, decreasing a number of successes required to pass, allowing a greater number of fails before concluding no match, and/or otherwise making the match phase easier for a positive determination of a match condition between the sample pattern and the reference pattern. In one sense, the pre-match phase evaluation suggests that it is improbable, to some level of confidence, that the sample pattern will not match the test pattern when the match process is performed. The prediction of a pass is used in these embodiments to speed up the process by quickly confirming the pre-test prediction.

In other cases, the pre-match phase may predict a non-match. In such a case, some embodiments of the present invention may predict a failed match with enough confidence that the match phase may be used as a final check to prove the pre-match prediction was in error and that there should be a match in spite of the predicted failure mode. While a normal match test may be employed, alternatively and preferably in some embodiments, some aspect of the match phase may be made more rigorous or onerous. This may be done by increasing a threshold required to pass, increasing a number of successes required to pass, allowing a lesser number of fails before concluding no match, and/or otherwise making the match phase more difficult for a positive determination of a match condition between the sample pattern and the reference pattern.

While either a predicted match or a predicted fail may each employ a "normal" match test, embodiments of the present invention will dynamically alter one or both of the match phases so that in at least one case, an altered match phase is implemented responsive to a prediction from the pre-match phase.

In some embodiments, the match phase may have two or more predetermined discrete levels of testing rigor, the pre-match prediction may appropriately select the appropriate level. In other cases, the match phase dynamic parameters may be determined uniquely for each pre-match prediction resulting in variable match thresholds.

Embodiments of the present invention may be used in other contexts as well. In some cases, a match phase having multiple different match thresholds may be employed in cooperation with operational modes of the associated system. That is, for many biometric verification systems, there is a registration mode in which the system is placed into a special trusted mode, such as to write reference patterns into a reference database. A system may employ a "relaxed" match mode when the system is in a trusted registration mode, for example.

In other cases, a user may desire to have a more relaxed match mode used in some environments, for example, when the user is at home and have the system employ a more stringent match mode when the user is in a public venue. Many portable electronic systems employing patterning systems also include geolocation features that could be used to place the device, and the user, and to automatically switch dynamic match modes based upon location or other environmental cues.

A machine-implemented pattern testing method comparing a first digital representation of a first pattern against a second digital representation of a second pattern using a match process for determining a match result from a first set of match features of interest of the first digital representation and a second set of match features of interest of the second digital representation using a set of predetermined match criteria, including a) extracting a first set of features of interest from the first digital representation; b) extracting a second set of features of interest from the second digital representation; c) establishing the first set of match features of interest of the first digital representation from the first set of features of interest; d) establishing the second set of match features of interest of the second digital representation from the second set of features of interest; and e) predicting a likelihood of a passed match for the match result, responsive to an evaluation of the sets of match features of interest prior to an execution of the match process, using the sets of match features of interest.

A non-transitory computer-readable medium for pattern testing comparing a first digital representation of a first pattern against a second digital representation of a second pattern using a match process for determining a match result from a first set of match features of interest of the first digital representation and a second set of match features of interest of the second digital representation using a set of predetermined match criteria, comprising instructions stored thereon, that when executed on a processor, perform the steps of: a) extracting a first set of features of interest from the first digital representation; b) extracting a second set of features of interest from the second digital representation; c) establishing the first set of match features of interest of the first digital representation from the first set of features of interest; d) establishing the second set of match features of interest of the second digital representation from the second set of features of interest; and e) predicting a likelihood of a passed match for the match result, responsive to an evaluation of the sets of match features of interest prior to an execution of the match process, using the sets of match features of interest.

A system for pattern testing to compare a first digital representation of a first pattern against a second digital representation of a second pattern using a match process for determining a match result from a first set of match features of interest of the first digital representation and a second set of match features of interest of the second digital representation using a set of predetermined match criteria, including: a processor that a) extracts a first set of features of interest from the first digital representation, b) extracts a second set of features of interest from the second digital representation, c) establishes the first set of match features of interest of the first digital representation from the first set of features of interest, and d) establishes the second set of match features of interest of the second digital representation from the second set of features of interest; and a memory for storing the digital representations, sets of features of interest, and sets of match features of interest; wherein the processor further e) predicts a likelihood of a passed match for the match result, responsive to an evaluation of the sets of match features of interest prior to an execution of the match process, using the sets of match features of interest.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for improving speed of automated pattern testing for any particular hardware configuration. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements. A fingerprint is a type of pattern.

As used herein, the phrase "pattern testing" means a comparison of one pattern against another pattern, such as in a fingerprint verification process in which one or more reference fingerprints secured within a trusted store are used in evaluating a fingerprint-under-test to gauge a probability of whether a source of the fingerprint-under-test is the same source that provided the reference fingerprints. There are other circumstances in which pattern testing is used in addition to fingerprint verification.

Figure 1:
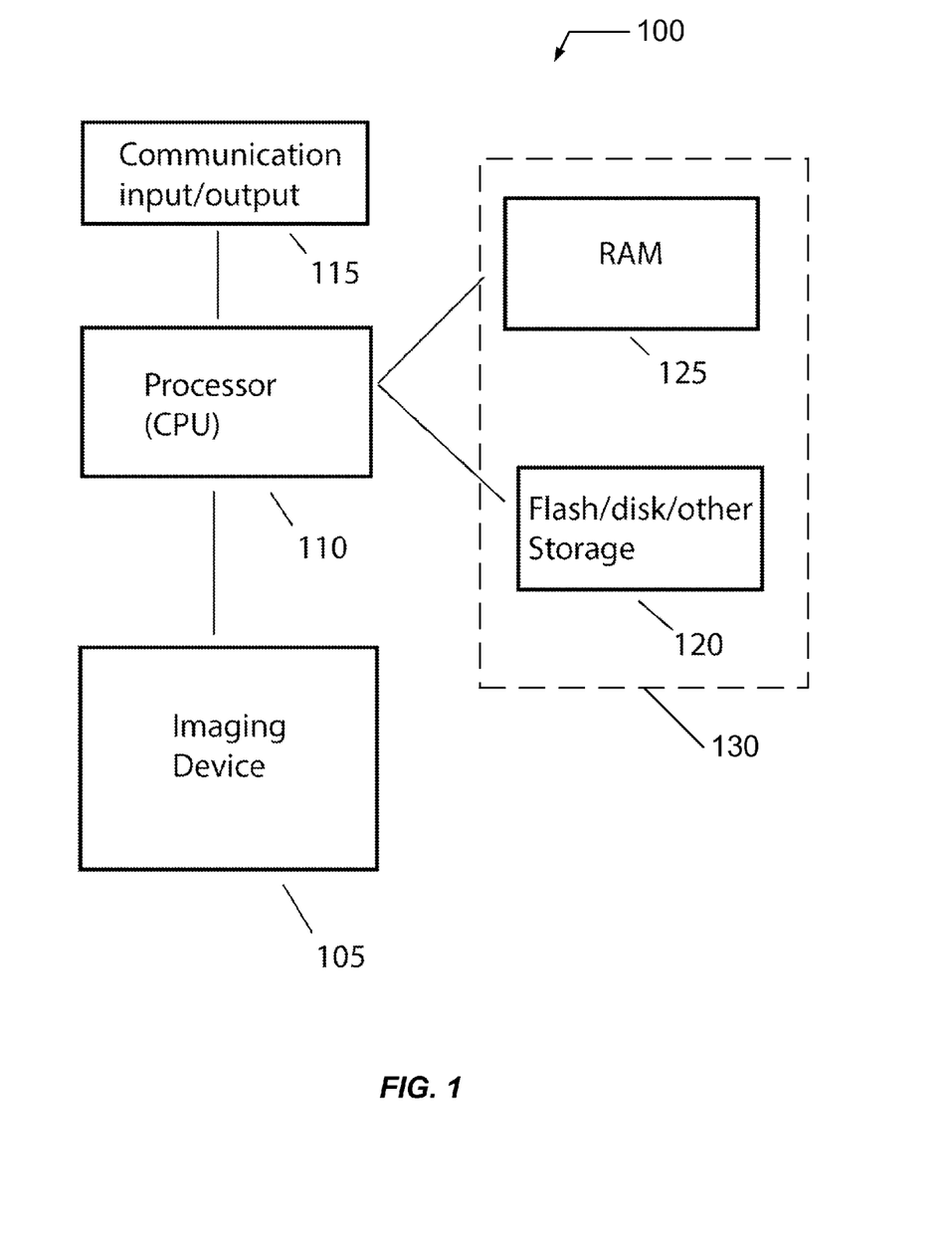
FIG. 1 illustrates a block schematic diagram of an embodiment for a pattern testing system.

FIG. 1 illustrates a block schematic diagram of an embodiment for a pattern testing system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a pattern testing system as opposed to some other type of fingerprint verification/checking/matching system. In one type of a pattern testing system, the system attempts to measure a correspondence between a pair of image patterns (one-on-one) in order to establish, within some level of confidence, whether one source of one pattern is the same or sufficiently close as a source of the other pattern. This is contrasted with an identification system that determines which pattern source generated a particular pattern. A verification system may be used as an identification system when a decrease in power/speed is acceptable, given fixed resources.

System 100 may function as a basic computer in implementing the present invention for accessing and processing patterns, pattern images, and sets of features of interest derived from a pattern as further described below. Processor 110 may include one or more central processing units (CPUs), selected from one or more of an x86, x64, ARM, or the like, architectures, connected to various other components, such as by a system bus.

Imaging device 105 produces an image of a pattern; either directly (e.g., it is a sensor or imager for a pattern source or an artifact from a pattern source) or it accesses a data structure or memory to obtain the image. The image may be of all or a portion of an entire pattern. Sometimes a portion of a pattern image may appear to be a set of discrete features of interest (e.g., curves or curved line segments, or minutia, or the like). System 100 is a general purpose computer having a large number of suitable implementations for accessing and processing resources, patterns, pattern images, portions of pattern images, and sets of features of interest derived from a pattern. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a pattern image produced from source 105. In some cases, system 105 may preprocess images, such as performing image keystone corrections (a geometric correction used to account for optical distortions associated with optical/prism based systems when returning an image size proportionate to pattern size or image reconstruction to assemble an image taken in bands as a pattern source is 'swiped' across the sensor.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Source 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 tests a first set of features of interest from a pattern source, such as a set of curved line segments from a fingerprint portion from a live finger, one-on-one against each registered set of features of interest in a known database recorded in memory 130.

Figure 2:
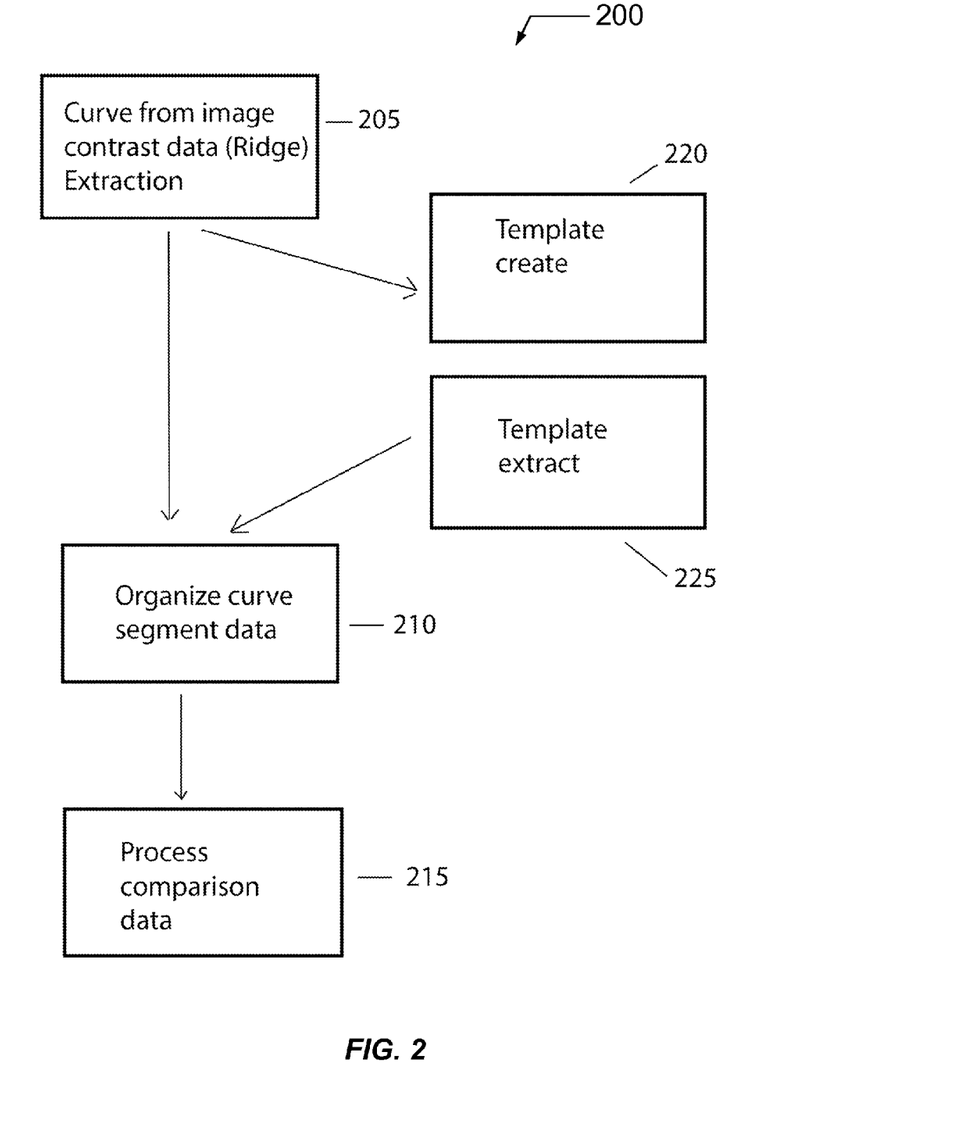
FIG. 2 illustrates a flow diagram of an embodiment for a pattern testing process.

FIG. 2 illustrates a flow diagram of an embodiment for curve comparison process 200. Process 200, executed by system 100 for example, includes three main subprocesses: step 205 is a feature-of-interest definition process (e.g., a curve segment extraction process); step 210 is an organize feature data subprocess following step 205; and step 215 is a compare data subprocess following step 210. Process 200 optionally includes template processing steps: a template create step 220 and a template extraction step 225.

System 100 may use much of the available features-of-interest data for image comparison. Preparation for comparison is step 205 while actual feature-of-interest comparison includes two basic steps: organize step 210 and compare step 215.

Feature of interest extraction step 205 creates a set of features of interest (e.g., a set of curved line segments) from an image of a pattern. There are many ways that the image may be processed to produce the set features of interest, some of which are dependent upon the type of sensor, type of image, and resources of system 100. A preferred curve extraction process explained further in U.S. Pat. No. 7,512,256, entitled "SYSTEM, METHOD, AND COMPUTER PROGRAM PRODUCT FOR RIDGE MAP FORMATION" may be adapted for extraction of curve segments, the contents of which are hereby expressly incorporated in its entirety by reference thereto for all purposes.

In a representative embodiment, registration images produced from sensor 105 have curve segment maps extracted, and templates made from the maps are stored efficiently into memory system 130 as encrypted templates for security and efficient use of memory. When the registered images are stored as templates, system 100 produces appropriate feature maps from the templates for use. The optional templates and encryption\decryption systems are explained further in U.S. Pat. No. 7,697,773, entitled "SYSTEM, METHOD, AND COMPUTER PROGRAM PRODUCT FOR IMAGE COMPRESSION/DECOMPRESSION," the contents of which are hereby expressly incorporated in its entirety by reference thereto for all purposes. Registered feature maps and/or templates from the registered feature maps may be stored in FLASH memory 120 for long term storage, and moved into RAM 125 for processing.

Figure 3:
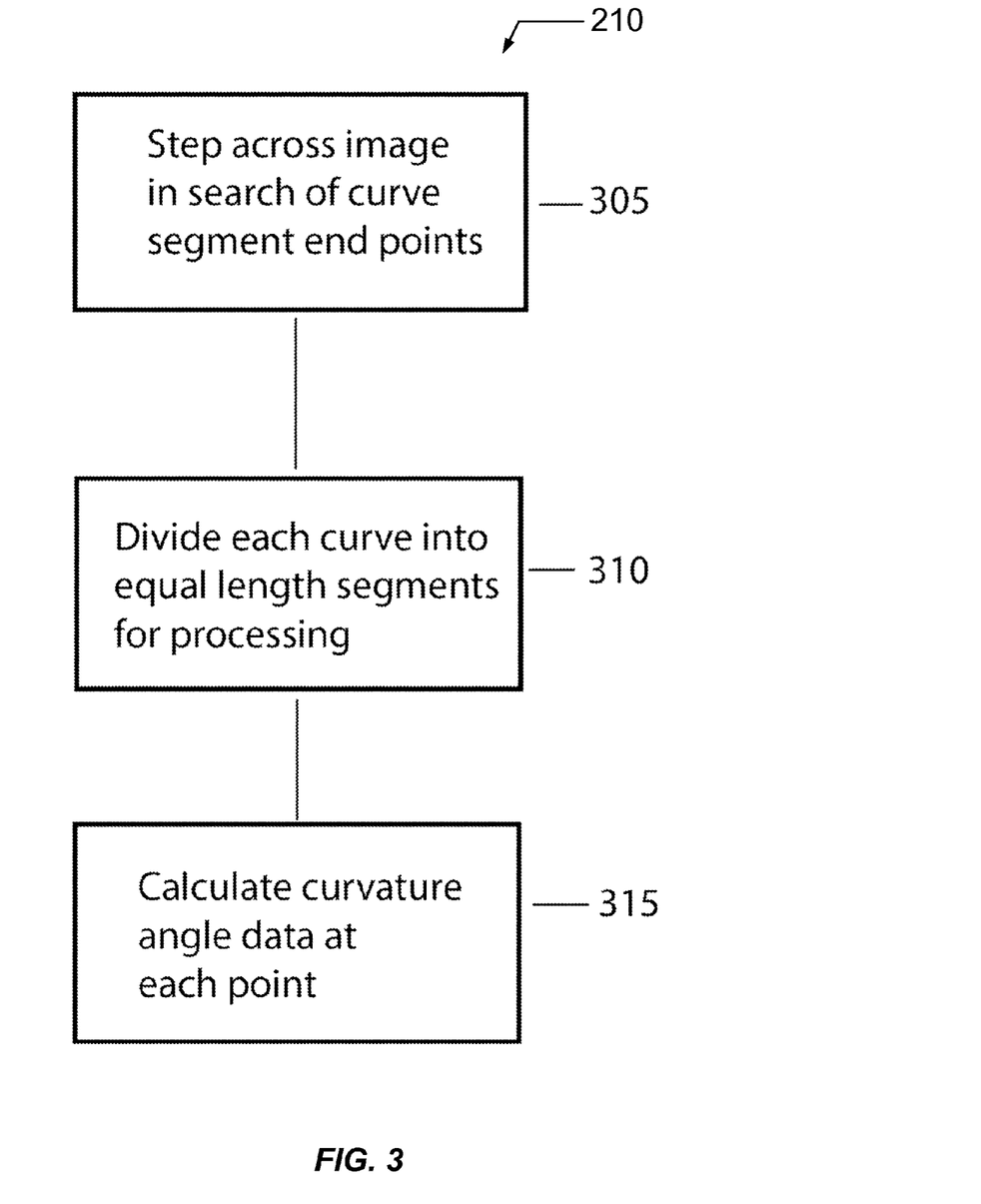
FIG. 3 illustrates a flow diagram for an embodiment for the organize subprocess illustrated in FIG. 2.

FIG. 3 illustrates a flow diagram for an embodiment of organize subprocess 210 illustrated in FIG. 2. Step 210 includes three substeps: a step substep 305, a divide substep 310, and a calculate substep 315.

Substep 305 steps across an image map for characteristic indicia of the desired features of interest (e.g., for curve segments, a characteristic indicia may include one or more endpoints), and collects the characteristic indicia into an array list. In any given image map of a portion of a pattern, a feature indicia may be an actual indicia or it may be an artifact of an artificial truncation of a feature of interest due to imaging device 105 and a relative position of the pattern source when imaging device sourced the image map being analyzed. Each set of features of interest of an image map includes a plurality of features, each feature appropriately identified, such a curve segment identified by an unbroken series of pixels extending from one curve segment endpoint to another curve segment endpoint along the same curve segment. A pixel for any given curve segment is adjacent at least one other pixel of the given curve segment, and adjacent no more than two such pixels (for some of the disclosed embodiments, system 100 allows a max of two, other embodiments in line (curve) drawing it is possible to have more than 2 depending upon the line/curve drawing method). When identifying features of an image map, information regarding the pattern source and/or pattern may be used to aid in optimization. For a pattern including a human fingerprint with curved line segments as features of interest, there are various characteristics that aid in identification of curve segments. For example, curve segments are not continually straight, nor does any curve segment turn too sharply.

Substep 310 parses each feature for analysis processing, such as dividing each identified curve segment into a series of equal length curve sub-segments for processing. A curve segment point is defined at a junction of each pair of adjoining curve sub-segments. These curve segment points, along with the curve segment endpoints, have thus been established at the conclusion of substep 310. In the discussion herein, a curve segment is identified as R(s), and these curve segment points along R(s) are identified as P(n), n=3 to a total number of curve segment points parsed along curve segment R(s) referred to as $n_{max}$. For the disclosed embodiments, n is a minimum of three as there are two endpoints and one midpoint. Practically, n is much larger than 3, on the order of 20 or more with it being a function of the image size and pattern source.

Substep 315 develops a suitable metric for the feature of interest, such as determining curve segment curvature angle data at each curve segment point when features of interest include curve segments. For each curve segment point P(n), determine an angle A(n) having a vertex at P(n), a first leg beginning at the vertex and extending to a first curve segment point P(n+d), and a second leg beginning at the vertex and extending to a second curve segment point P(n−d) for an integer d selected from the set {1 . . . x}, x less than or equal to $n_{max}/2$. Substep 315 establishes a set of A(n) for each curve segment point P(n) (alternatively the curve segment could also be used equally) along R(s) of an image map. There are other ways that a curvature of a curve segment may be characterized and used to determine a figure of merit for determining whether a particular curve segment in one image sufficiently conforms to a particular curve segment in another image.

Figure 4:
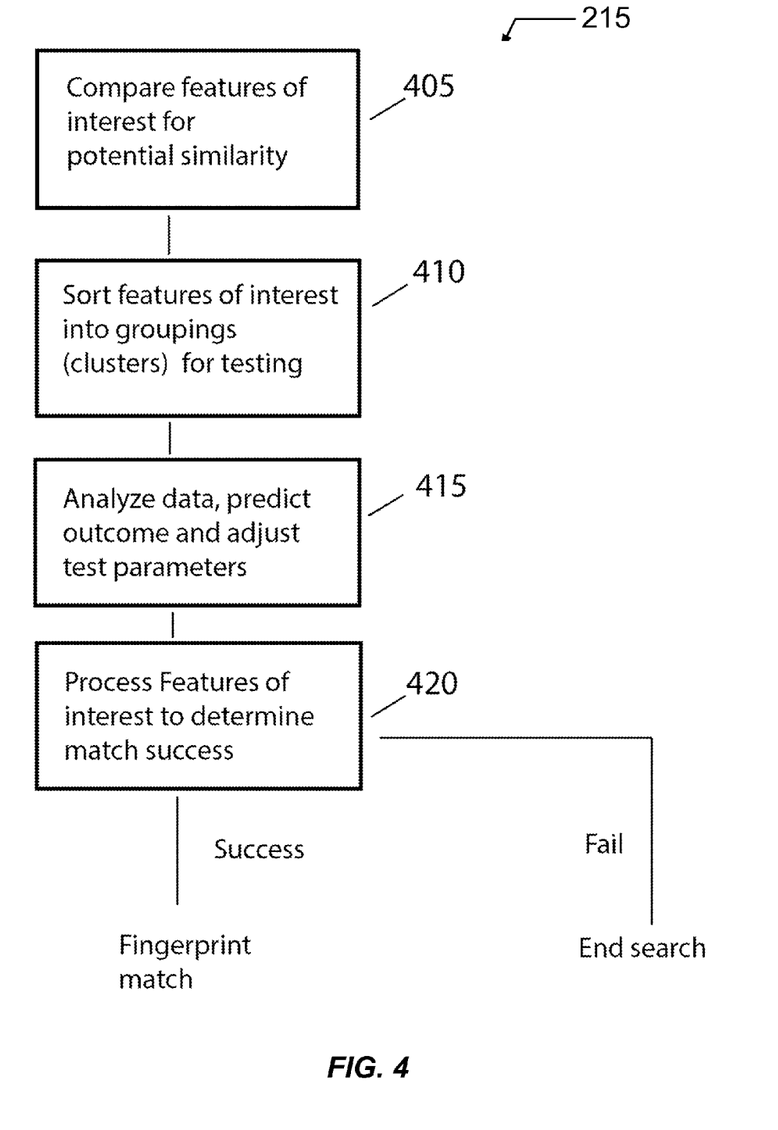
FIG. 4 illustrates a flow diagram for a preferred embodiment for the comparison subprocess illustrated in FIG. 2.

FIG. 4 illustrates a flow diagram for a preferred embodiment for the comparison subprocess step 215 illustrated in FIG. 2. Comparison subprocess step 215 evaluates a first image having a set of features (for example, a pattern image of a fingerprint from a stored history (h) of registered/authorized images) against features from an image under test (t) (for example, a live image from a fingerprint sensor). Comparison subprocess step 215 is, effectively, comparing every feature of the image from a stored history against every feature of the image under test. A goal is to find conforming features of interest common to both images. A figure of merit is calculated for each comparison. Further testing is performed to determine a relative positional figure of merit for groupings of candidate conforming to make sure that a set of identified conforming features of interest found in each image actually share a common relative positional relationship. The greater the number of closely conforming features of interest that share a common relative positional relationship, the greater a confidence that the two images (e.g., sets of curves) match. For some embodiments, a high enough confidence from step 215 may offer acceptable security. In other cases, results from step 215 may be used to initiate a more rigorous matching process, with identified conforming features of interest, or specified features along the identified conforming features of interest, providing one or more features of interest for the rigorous testing. In other cases, a confidence of match from step 215 may dynamically adjust subsequent match process as further described herein.

Step 215 includes a set of substeps 405-430. Substep 405 compares features of interest (e.g., curved line segments) for potential similarity. Substep 410 sorts similar features of interest into groupings (e.g., clusters) for testing. Substep 415 analyzes data, predicts outcome, and adjusts test parameters. Substep 420 processes feature of interest to determine a likelihood of match success.

Substep 420 thus determines a likelihood of match success which may be quantized (e.g., two or more discrete values such as a "high" likelihood or a "low" likelihood based upon preestablished threshold values) or the likelihood of match success may be provided as some "analog" value ranging from a great likelihood of a successful match to an small likelihood of a successful match. There are a number of ways that this may be used, depending upon implementation details of the pattern testing system.

For example, a very low likelihood of success may in some cases be used dispositively to skip any subsequent match process and flag the pattern-under-test as a non-match. In other situations, the match process may be adjusted to require an extra-special level of "match" processing before the pattern-under-test is determined to be a match. This allows a rigorous matching process to overcome a predicted match failure due to passing a heightened level of review.

A very high likelihood of success may be used dispositively as well to skip any subsequent match process and flag the pattern-under-test as a match. In other situations, the match process may be adjusted to require a different type of extra-special level of "match" processing before the pattern-under-test is determined to a match, in this case a reduction in the match checking. This allows a "sanity" check matching process to override a predicted match pass due to failing a lowered level of review.

For situations that are not very high or very low, a "normal" match process is executed. Some implementations may include differing ones of these tests. For instance, an implementation may include all these conditions—an extremely low likelihood of success may automatically flag the pattern as a match fail, a higher likelihood of success may trigger a more rigorous match process, a higher value a "normal" match process, a higher value may allow a more cursory match test and a very high value for the likelihood success resulting in an automatic match.

Other situations may simply provide the match process with a value indicating the likelihood of a match and allow the match process to dynamically adjust its internal tests responsive to that value in determining a definitive "match" result for the two patterns being compared. Still other situations may dispense with one "end" of the match adjustment model, such as never triggering a lowered match analysis or never triggering a heightened match analysis.

While there are many different features of interest that may be applicable to different patterns and comparison goals, as one example, the following discusses use of a fingerprint as a pattern, and use of curved line segments from an image of the fingerprint as features of interest.

In operation, two images are compared as noted herein, each referred to in the following discussion as an image under test (it being the case that in some applications, one image under test is from a known authorized registration database and the other image under test is from an unknown pattern source, it being desired to, for example, verify that the unknown pattern source is authorized based upon a match into the known database). Each image includes a collection of curve segments R(s), s an integer from 1 to a total number of curve segments. An $s^{th}$ curve segment of an image number one is R(t1)(s) and an $s^{th}$ curve segment of an image number two is R(t2)(s). Curve segment points along a curve segment R(t1)(s) of image number one are identified as P(t1)(n) and curve segment points along a curve segment R(t2)(s) of image number two are identified as P(t2)(n). An angle is determined for each curve segment point along each curve segment of each image. An angle for an $n^{th}$ point along curve segment R(t1)(s) is P(t1)A(n) and an angle for an $n^{th}$ point along curve segment R(t2)(s) is P(t2)A(n).

The comparison, when unoptimized, performs a nested method comparison in which, for every curve segment R(t1)(s), s=1 to $S_{t1max}$ of image map one and every curve segment R(t2)(s), s=1 to $S_{t2max}$ of image map two, a comparison is made of curve segment combinations of image map 1 to image map 2 centered at each point P(n). That is, for example, R(t1)A(n) is compared to R(t2)A(n), R(t1)A(n) is compared to R(t2)A(n+1), and R(t1)A(n) is compared to R(t2)A(n+2) for all valid comparisons. A maximum number of curve segments points along any particular curve segment is $n_{max}$ and each angle A(i) is determined using a number d of curve segment points spaced from the $i^{th}$ curve segment point. Therefore the first available angle of a curve segment R(t1)(s) is P(t1)A(1+d) and the last available angle for R(t1)(s) is P(t1)A($n_{max}$-d).

Comparing a curve segment requires evaluating each point angle along the curve element. Disclosed is a comparison engine which sums absolute values of angular differences at each point along the curve segment. Two curve segments are said to be similar and a candidate for conformance based upon how close this difference sum, referred to as a figure of merit M approaches zero (i.e., the lowest difference sums are the closest conforming curve segments).

A figure of merit, $M_{j,k}$:

$$M_{j,k} = \sum_{i=1+d}^{n_{max}-d} |(P(t2)A(i)R(t2)(j) - P(t1)A(i)R(t1)(k)|$$

$j = 1$ to $S_{t1max}$, $k = 1$ to $S_{t2max}$

Each value of $M_{j,k}$ identifies a figure of merit for a conformance of a particular curve segment of image one (the kth curve segment or R(t1)(k) as compared to a particular curve segment of image two (the $j^{th}$ curve segment or R(t2)(j)). The lowest values for $M_{j,k}$ represent the best candidates for conformance.

Once performing these comparisons, care is taken to account for the possibility that similar curve segment end points may not exist in both image maps even for the same curve segment imaged in both maps. One reason for this possibility is that the image capture size area may be positioned differently when obtaining the different images, and the visible boundary of the pattern is different.

Also of note is that the angles are determined based upon information local to the curve segment. This means that the angle values are rotationally independent and are not affected by rotations of a pattern within an image map.

Once candidate conforming curve segments are established by the first part of the comparison subprocess 215, a second part evaluates positional relativity among them. This evaluation includes grouping the best matching curve segments into one or more clusters in each image and then quantifying relative measurements between the curve segments of the group in both images. Disclosed is a simple methodology of determining a figure of merit for this relative positional figure of merit. For each curve segment of a group of an image map, the end points and a mid-point are used to test initial location proximity. Triangulation differences among distances from each point on one curve segment to the three identified points of each other curve segment in the group for both image maps. These collective values provide one mechanism to confirm relative positions of the candidate conforming curve segments. The use of triangulation also offers a rotationally independent confirmation.

Comparison substep 215 thus identifies possibly conforming curve segments common to both image maps. These curve segments are clustered together in each image map and then relative positional information among the curve segments of the cluster in both image map are compared. When all the positional information sufficiently matches for all the curve segments of the cluster between the image maps, the creation of a cluster is a success.

The greater the number of conforming curve segments in a cluster having a high relative positional figure of merit, the better the possibility that the two image maps are from the same pattern source. The curve segments in the cluster with the best match are used for the more rigorous pattern matching to efficiently verify a match with a very high confidence.

An evaluation of the number of conforming features of interest between patterns, and an appropriate figure of merit for a "matchiness" of the clusters of conforming features of interest (such as the positional figure of merit for curved line segments) are used to indicate a likelihood of a match.

Not all systems and methods are necessarily going to be discretely separated into a "pre-match" process and a match process. For purposes of the present invention, the match process is the evaluation engine that evaluates features of interest to determine whether two patterns match. The pre-match process is a process that identifies the features of interest. A feature of some of the disclosed embodiments of the present invention is that a likelihood of a match, a prediction of a match test, may be established in the pre-match phase that may be used for the match phase (or in some cases, skipping the match phase altogether for particularly high and/or low likelihoods of match success). Pre-match prediction may thus be part of the pre-match process of locating and confirming features of interest, or it may be a separate phase after the features of interest have been determined but before the match process begins.

Further, in some implementations it may be desirable to predict a likelihood of a failed match rather than a likelihood of a passed match for the match result. The present invention includes such predictions and the embodiments may be adjusted accordingly.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code and/or instructions for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, and the like) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A machine-implemented pattern testing method comparing a first digital representation of a first pattern against a second digital representation of a second pattern using a match process for determining a match result from a first set of match features of interest of the first digital representation and a second set of match features of interest of the second digital representation using a set of predetermined match criteria, comprising executing on a processor the steps of:
a) extracting, using the processor, a first set of features of interest from the first digital representation;
b) extracting, using the processor, a second set of features of interest from the second digital representation;
c) establishing, using the processor, the first set of match features of interest of the first digital representation from said first set of features of interest;
d) establishing, using the processor, the second set of match features of interest of the second digital representation from said second set of features of interest; and
e) predicting, using the processor, a likelihood of a passed match for the match result, responsive to an evaluation of the sets of match features of interest prior to an execution of the match process, using the sets of match features of interest;

wherein predicting the likelihood of a passed match comprises, predicting a degree of pass-match through non-match with confidence to determine whether to execute a normal match process.

2. A machine-implemented pattern testing method comparing a first digital representation of a first pattern against a second digital representation of a second pattern using a match process for determining a match result from a first set of match features of interest of the first digital representation and a second set of match features of interest of the second digital representation using a set of predetermined match criteria, comprising executing on a processor the steps of:
a) extracting a first set of features of interest from the first digital representation;
b) extracting a second set of features of interest from the second digital representation;
c) establishing the first set of match features of interest of the first digital representation from said first set of features of interest;
d) establishing the second set of match features of interest of the second digital representation from said second set of features of interest; and
e) predicting a likelihood of a passed match for the match result, responsive to an evaluation of the sets of match features of interest prior to an execution of the match process, using the sets of match features of interest; further comprising:
f) adjusting, responsive to said likelihood of said passed match for the match result, a match criterion of the set of predetermined match criteria of the match process to produce an adjusted set of match criteria different from the set of predetermined match criteria; and
g) performing the match process to produce the match result using said adjusted set of match criteria instead of the set of predetermined match criteria;
wherein predicting the likelihood of a passed match comprises, predicting a degree of pass-match through non-match with confidence to determine whether to execute a normal match process.

3. The pattern testing method of claim 1 further comprising:
f) skipping the match process when said likelihood of said passed match for the match result exceeds a predetermined high likelihood threshold; and
g) setting the match result as said passed match without performing the match process.

4. The pattern testing method of claim 1 further comprising:
f) skipping the match process when said likelihood of said passed match for the match result falls below a predetermined low likelihood threshold; and
g) setting the match result as a failed match without performing the match process.

5. The pattern testing method of claim 2 further comprising:
h) skipping the match process when said likelihood of said passed match for the match result exceeds a predetermined high likelihood threshold; and
i) setting the match result as said passed match without performing the match process.

6. The pattern testing method of claim 2 further comprising:
h) skipping the match process when said likelihood of said passed match for the match result falls below a predetermined low likelihood threshold; and
i) setting the match result as a failed match without performing the match process.

7. The pattern testing method of claim 1 wherein said establishing step c) and said establishing step d) includes:
f) comparing the sets of features of interest to establish a pair of sets of conforming features of interest having a conformance metric responsive to a predetermined threshold, said pair of sets of conforming features of interest including a first set of conforming features of interest from said first set of features of interest and including a second set of conforming features of interest from said second set of features of interest wherein said sets of conforming features of interest each include a plurality of conforming features of interest common to both said first set of features of interest and to said second set of features of interest;
g) evaluating a group metric for said sets of conforming features of interest;
h) selecting said first set of conforming feature of interest as the first set of match features of interest of the first digital representation when said group metric exceeds a predetermined threshold; and
i) selecting said second set of conforming feature of interest as the second set of match features of interest of the second digital representation when said group metric exceeds said predetermined threshold.

8. The pattern testing method of claim 7 wherein said predicting step e) includes an evaluation of a degree of a conformance of said sets of features of interest and said group metric when establishing said likelihood of the match result.

9. A non-transitory computer-readable medium for pattern testing comparing a first digital representation of a first pattern against a second digital representation of a second pattern using a match process for determining a match result from a first set of match features of interest of the first digital representation and a second set of match features of interest of the second digital representation using a set of predetermined match criteria, comprising instructions stored thereon, that when executed on a processor, perform the steps of:
a) extracting a first set of features of interest from the first digital representation;
b) extracting a second set of features of interest from the second digital representation;
c) establishing the first set of match features of interest of the first digital representation from said first set of features of interest;

d) establishing the second set of match features of interest of the second digital representation from said second set of features of interest; and e) predicting a likelihood of a passed match for the match result, responsive to an evaluation of the sets of match features of interest prior to an execution of the match process, using the sets of match features of interest;

wherein predicting the likelihood of a passed match comprises, predicting a degree of pass-match through non-match with confidence to determine whether to execute a normal match process.

10. A non-transitory computer-readable medium for pattern testing comparing a first digital representation of a first pattern against a second digital representation of a second pattern using a match process for determining a match result from a first set of match features of interest of the first digital representation and a second set of match features of interest of the second digital representation using a set of predetermined match criteria, comprising instructions stored thereon, that when executed on a processor, perform the steps of:

a) extracting a first set of features of interest from the first digital representation;

b) extracting a second set of features of interest from the second digital representation;

c) establishing the first set of match features of interest of the first digital representation from said first set of features of interest;

d) establishing the second set of match features of interest of the second digital representation from said second set of features of interest; and e) predicting a likelihood of a passed match for the match result, responsive to an evaluation of the sets of match features of interest prior to an execution of the match process, using the sets of match features of interest;

wherein the instructions, when executed on the processor, further comprise the steps of:

f) adjusting, responsive to said likelihood of said passed match for the match result, a match criterion of the set of predetermined match criteria of the match process to produce an adjusted set of match criteria different from the set of predetermined match criteria; and g) performing the match process to produce the match result using said adjusted set of match criteria instead of the set of predetermined match criteria;

wherein predicting the likelihood of a passed match comprises, predicting a degree of pass-match through non-match with confidence to determine whether to execute a normal match process.

11. The medium of claim 9 wherein the instructions, when executed on the processor, further comprise the steps of:

f) skipping the match process when said likelihood of said passed match for the match result exceeds a predetermined high likelihood threshold; and g) setting the match result as said passed match without performing the match process.

12. The medium of claim 9 wherein the instructions, when executed on the processor, further comprise the steps of:

f) skipping the match process when said likelihood of said passed match for the match result falls below a predetermined low likelihood threshold; and g) setting the match result as a failed match without performing the match process.

13. The medium of claim 10 wherein the instructions, when executed on the processor, further comprise the steps of:

h) skipping the match process when said likelihood of said passed match for the match result exceeds a predetermined high likelihood threshold; and i) setting the match result as said passed match without performing the match process.

14. The medium of claim 10 wherein the instructions, when executed on the processor, further comprise the steps of:

h) skipping the match process when said likelihood of said passed match for the match result falls below a predetermined low likelihood threshold; and i) setting the match result as a failed match without performing the match process.

15. A system for pattern testing to compare a first digital representation of a first pattern against a second digital representation of a second pattern using a match process for determining a match result from a first set of match features of interest of the first digital representation and a second set of match features of interest of the second digital representation using a set of predetermined match criteria, comprising: a processor that a) extracts a first set of features of interest from the first digital representation, b) extracts a second set of features of interest from the second digital representation, c) establishes the first set of match features of interest of the first digital representation from said first set of features of interest, and d) establishes the second set of match features of interest of the second digital representation from said second set of features of interest; and a memory for storing the digital representations, sets of features of interest, and sets of match features of interest; wherein said processor further e) predicts a likelihood of a passed match for the match result, responsive to an evaluation of the sets of match features of interest prior to an execution of the match process, using the sets of match features of interest;

wherein predicting the likelihood of a passed match comprises, predicting a degree of pass-match through non-match with confidence to determine whether to execute a normal match process.

16. A system for pattern testing to compare a first digital representation of a first pattern against a second digital representation of a second pattern using a match process for determining a match result from a first set of match features of interest of the first digital representation and a second set of match features of interest of the second digital representation using a set of predetermined match criteria, comprising: a processor that a) extracts a first set of features of interest from the first digital representation, b) extracts a second set of features of interest from the second digital representation, c) establishes the first set of match features of interest of the first digital representation from said first set of features of interest, and d) establishes the second set of match features of interest of the second digital representation from said second set of features of interest; and a memory for storing the digital representations, sets of features of interest, and sets of match features of interest; wherein said processor further e) predicts a likelihood of a passed match for the match result, responsive to an evaluation of the sets of match features of interest prior to an execution of the match process, using the sets of match features of interest;

wherein predicting the likelihood of a passed match comprises, predicting a degree of pass-match through non-match with confidence to determine whether to execute a normal match process.

17. The system of claim 15 wherein said processor further:
   f) skips the match process when said likelihood of said passed match for the match result exceeds a predetermined high likelihood threshold; and
   g) sets the match result as said passed match without performing the match process.

18. The system of claim 15 wherein said processor further:
   f) skips the match process when said likelihood of said passed match for the match result falls below a predetermined low likelihood threshold; and
   g) sets the match result as a failed match without performing the match process.

19. The system of claim 16 wherein said processor further:
   h) skips the match process when said likelihood of said passed match for the match result exceeds a predetermined high likelihood threshold; and
   i) sets the match result as said passed match without performing the match process.

20. The system of claim 16 wherein said processor further:
   h) skips the match process when said likelihood of said passed match for the match result falls below a predetermined low likelihood threshold; and
   i) sets the match result as a failed match without performing the match process.

* * * * *